A. HOLTZ.
SIGNAL FOR MOTOR CARS.
APPLICATION FILED MAY 17, 1915.
1,167,821.
Patented Jan. 11, 1916.
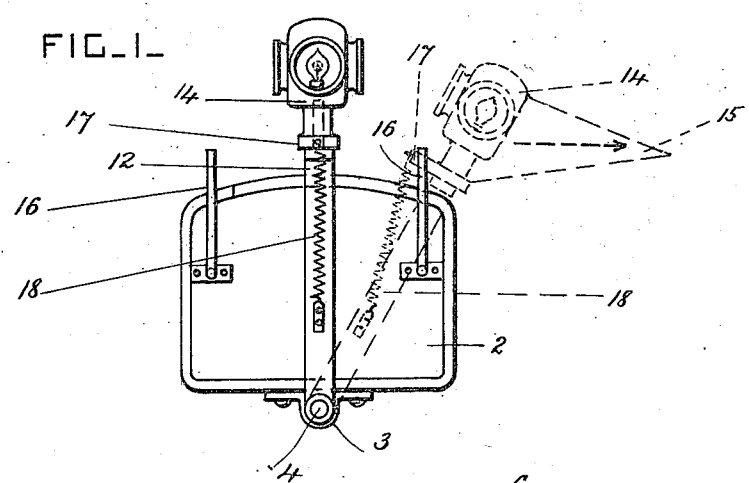
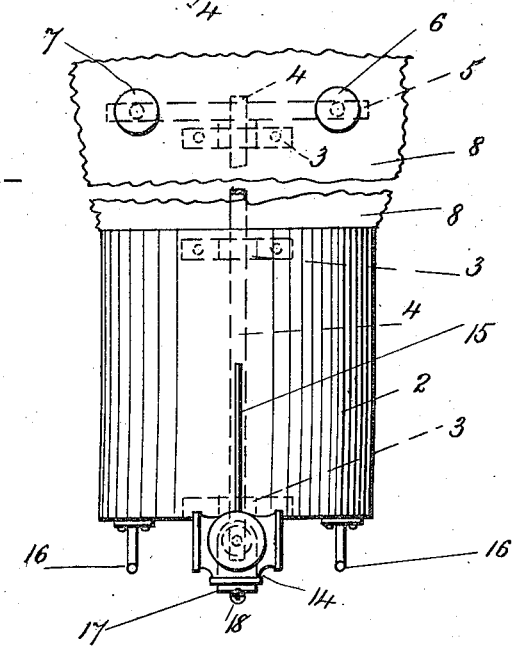
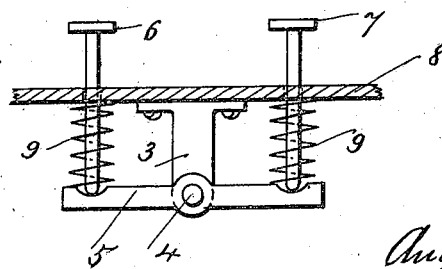
Inventor
August Holtz
By Herbert W. Jenner.
Attorney

UNITED STATES PATENT OFFICE.

AUGUST HOLTZ, OF DETROIT, MICHIGAN.

SIGNAL FOR MOTOR-CARS.

1,167,821.  Specification of Letters Patent.  Patented Jan. 11, 1916.

Application filed May 17, 1915. Serial No. 28,619.

*To all whom it may concern:*

Be it known that I, AUGUST HOLTZ, a subject of the Emperor of Russia, residing at Detroit, in the county of Wayne and State of Michigan, have invented certain new and useful Improvements in Signals for Motor-Cars; and I do hereby declare the following to be a full, clear, and exact description of the invention, such as will enable others skilled in the art to which it appertains to make and use the same.

This invention relates to signals adapted to be arranged at the front ends of motor cars to indicate whether the car is going to diverge from a straight line of travel toward the right or toward the left; and it consists in the novel construction and combination of the parts hereinafter fully described and claimed.

In the drawings, Figure 1 is a front end view of a portion of a motor car provided with a signal according to this invention. Fig. 2 is a plan view of the signal. Fig. 3 is a rear end view of the operating pedals.

The front end portion 2 or radiator of the motor car has bearings 3 secured to its underside, and a rock-shaft 4 is journaled in these bearings and is arranged longitudinally of and at the center line of the car. The rear end portion of this shaft has a crossbar 5 secured on it and arranged under the feet of the driver. Two pedals 6 and 7 are operatively connected with the end portions of the crossbar, and their stems project upwardly through holes in the foot-plate 8 of the car. Springs 9 are interposed between the foot-plate and the crossbar, so that the crossbar is normally held in a horizontal position.

An arm 12 is secured to the front end portion of the rock-shaft, and it projects upwardly in front of the radiator, and a signal lamp 14 having a laterally projecting pointer signal 15 is pivoted on the upper end portion of the arm 12.

The lamp is of any approved construction, and an electric lamp is preferably used. The light is inclosed in a suitable lantern, and it has lenses of any desired color, and it is preferably dark on the side from which the signal projects and which is normally turned toward the driver.

The pointer signal is of any approved form. The signals are moved to the right or to the left according to the intention of the driver to proceed to the right or to the left.

The radiator or car frame has projections 16 at the side portions of its front end, and when the signals are moved sufficiently, one of these projections strikes a lug 17 on the lantern or signal and turns the signal a quarter of a revolution against the pull of a spring 18 which normally holds the pointer signal longitudinally of the car. The position of the signals when moved in one direction is indicated by dotted lines in Fig. 1.

The crossbar 5 may be operatively connected with the rock-shaft in any other approved way besides being secured directly to it, so as to suit the level of the car bottom.

The use of this signal apparatus greatly decreases the liability to head-on collisions. The rock-shaft can also be operated by the driver by any other approved operating devices besides the pedals.

What I claim is:

1. The combination, with the front end portion of a motor car, of a rock-shaft mounted longitudinally on the center line of the car and provided with an upwardly projecting arm at its front end, a signal lamp and a pointer signal rigidly secured together and pivoted to move in a normally horizontal plane on the upper end portion of the said arm, operating devices for oscillating the said arm, and means for moving the signals pivotally on the arm when the arm is moved to the right or to the left so as to turn a different side of the lamp and signal to the front and thereby indicate the change in the direction of travel of the car.

2. The combination, with the front end portion of a motor car, of a rock-shaft mounted longitudinally on the center line of the car and provided with an upwardly projecting arm at its front end, a signal lamp and a pointer signal rigidly secured together and pivoted to move in a normally horizontal plane on the upper end portion of the said arm, a crossbar operatively connected with the rear end portion of the rock-shaft, means for operating the rock-shaft, springs normally holding the crossbar in a horizontal position and the said arm in a vertical position, and means for moving the signal pivotally on the arm when the arm is moved to the right or to the left to turn a different side of the lamp and pointer signal to the front and thereby indicate the change in the direction of travel of the car.

3. The combination, with a motor car, of an arm having its lower end portion pivoted on the center line of the car at one end thereof and provided at its upper end with a normally vertical pivot, a signal lamp and a pointer signal rigidly secured together and mounted on the said pivot, a spring arranged to normally hold the lamp and pointer signal so that the latter is arranged longitudinally of the car, means for oscillating the said arm at will to move the lamp and pointer signal laterally, and means for automatically turning the lamp and pointer signal partially around on the said pivot when they are moved laterally by the said arm.

In testimony whereof I affix my signature.

AUGUST HOLTZ.